(12) United States Patent
Chu et al.

(10) Patent No.: US 10,867,565 B2
(45) Date of Patent: Dec. 15, 2020

(54) PIXEL ARRAY SUBSTRATE

(71) Applicant: Au Optronics Corporation, Hsinchu (TW)

(72) Inventors: Chao-Yu Chu, Taipei (TW); Hsin-Chun Huang, Hsinchu County (TW); Shao-Syuan Ji, Hsinchu (TW); Mei-Shan Lin, Hsinchu (TW); Wen-Rei Guo, Miaoli County (TW)

(73) Assignee: Au Optronics Corporation, Hsinchu (TW)

(*) Notice: Subject to any disclaimer, the term of this patent is extended or adjusted under 35 U.S.C. 154(b) by 0 days.

(21) Appl. No.: 16/214,146

(22) Filed: Dec. 10, 2018

(65) Prior Publication Data

US 2020/0013352 A1 Jan. 9, 2020

(30) Foreign Application Priority Data

Jul. 5, 2018 (TW) .............................. 107123376 A

(51) Int. Cl.
*G09G 3/36* (2006.01)
(52) U.S. Cl.
CPC ......... *G09G 3/3607* (2013.01); *G09G 3/3648* (2013.01); *G09G 3/3685* (2013.01)
(58) Field of Classification Search
CPC ... G09G 3/3607; G09G 3/3648; G09G 3/3685
See application file for complete search history.

(56) References Cited

U.S. PATENT DOCUMENTS

| 9,165,946 B1 | 10/2015 | Chang et al. |
| 9,190,005 B2 | 11/2015 | Watsuda et al. |
| 9,472,151 B2 | 10/2016 | Watsuda et al. |
| 2007/0029613 A1 | 2/2007 | Moriwaki |
| 2010/0245749 A1* | 9/2010 | Kimura ............. G02F 1/134363 349/143 |
| 2010/0289994 A1* | 11/2010 | Nonaka ............. G02F 1/133514 349/108 |

(Continued)

FOREIGN PATENT DOCUMENTS

| TW | 200408130 | 5/2004 |
| TW | 201535691 | 9/2015 |

(Continued)

*Primary Examiner* — Ariel A Balaoing
(74) *Attorney, Agent, or Firm* — JCIPRNET

(57) ABSTRACT

A pixel array substrate including a substrate, a first scan line, a first sub-pixel, a second scan line, a second sub-pixel, and a common electrode is provided. The substrate has a first region and a second region. A length of the first region is smaller than a length of the second region. Two opposite sides of the second region correspond to two opposite sides of the substrate respectively. At least one side of the first region does not correspond to one of the two opposite sides of the substrate. The first scan line is disposed on the first region. The first sub-pixel is electrically connected to the first scan line. The second scan line is disposed on the second region. The second sub-pixel is electrically connected to the second scan line. The common electrode is disposed on the substrate. A vertical distance between the common electrode and the first scan line is V11, a vertical distance between the common electrode and the second scan line is V2, and V2>V11.

8 Claims, 17 Drawing Sheets

(56) References Cited

U.S. PATENT DOCUMENTS

| | | | |
|---|---|---|---|
| 2015/0255030 A1 | 9/2015 | Watsuda et al. | |
| 2016/0005371 A1 | 1/2016 | Watsuda et al. | |
| 2016/0054625 A1* | 2/2016 | Hsia | G02F 1/136227 |
| | | | 349/43 |
| 2016/0247478 A1* | 8/2016 | Ishige | G09G 3/3677 |
| 2016/0343735 A1* | 11/2016 | Chen | H01L 27/1259 |
| 2016/0370622 A1* | 12/2016 | Kim | G02F 1/1368 |
| 2017/0108743 A1* | 4/2017 | Chu | G02F 1/133305 |
| 2017/0228077 A1* | 8/2017 | Abe | G02F 1/134309 |
| 2017/0309644 A1* | 10/2017 | Yeh | H01L 27/124 |
| 2019/0043414 A1* | 2/2019 | Wu | G09G 3/2092 |

FOREIGN PATENT DOCUMENTS

| | | |
|---|---|---|
| TW | 201544883 | 12/2015 |
| TW | I601121 | 10/2017 |

* cited by examiner

US 10,867,565 B2

PIXEL ARRAY SUBSTRATE

CROSS REFERENCE TO RELATED APPLICATION

This application claims the priority benefit of Taiwan application serial no. 107123376, filed on Jul. 5, 2018. The entirety of the above-mentioned patent application is hereby incorporated by reference herein and made a part of specification.

BACKGROUND OF THE INVENTION

Field of the Invention

The invention relates to a pixel array substrate, and particularly relates to a pixel array substrate including a common electrode.

Description of Related Art

Presently, a pixel array substrate in a display device generally adopts a non-rectangular, free-form substrate for design requirements. In order to cope with a shape of the free-form substrate, in a display region of the free-form substrate, lengths of a part of scan lines are different from lengths of other part of scan lines, which results in a fact that different scan lines in the pixel array substrate have different capacitances. The display device is liable to have bright lines or have a flickering phenomenon due to that the different scan lines have different capacitances, which severely influences display quality of the display device.

Therefore, a solution for resolving the aforementioned problem is required.

SUMMARY OF THE INVENTION

At least one embodiment of the invention is directed to a pixel array substrate, which mitigates a problem of uneven capacitance distribution on different scan lines.

At least one embodiment of the invention provides a pixel array substrate including a substrate, a first scan line, a first sub-pixel, a second scan line, a second sub-pixel, and a common electrode. The substrate has a first region and a second region. The length of the first region is smaller than the length of the second region. Two opposite sides of the second region respectively correspond to two opposite sides of the substrate. At least one side of the first region does not correspond to one of the two opposite sides of the substrate. The first scan line is located on the first region. The first sub-pixel is electrically connected to the first scan line. The second scan line is located on the second region. The second sub-pixel is electrically connected to the second scan line. The common electrode is located on the substrate. A vertical distance between the common electrode and the first scan line is V11, a vertical distance between the common electrode and the second scan line is V2, and V2>V11.

At least one embodiment of the invention provides a pixel array substrate including a substrate, a first scan line, a plurality of first sub-pixels, a second scan line, a plurality of second sub-pixels, and a common electrode. The first scan line is located on the substrate. The first sub-pixels are electrically connected to the first scan line. The second scan line is located on the substrate. The second sub-pixels are electrically connected to the second scan line. The number of the second sub-pixels is greater than the number of the first sub-pixels. The common electrode is located on the substrate. A vertical distance between the common electrode and the first scan line is V11, a vertical distance between the common electrode and the second scan line is V2, and V2>V11.

One of the purposes of the invention is to mitigate a problem of uneven capacitance distribution on different scan lines in the pixel array substrate.

One of the purposes of the invention is to mitigate a problem of uneven capacitance distribution in the pixel array substrate of a liquid crystal display panel.

One of the purposes of the invention is to mitigate bright lines or a flicking phenomenon of the liquid crystal display panel.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
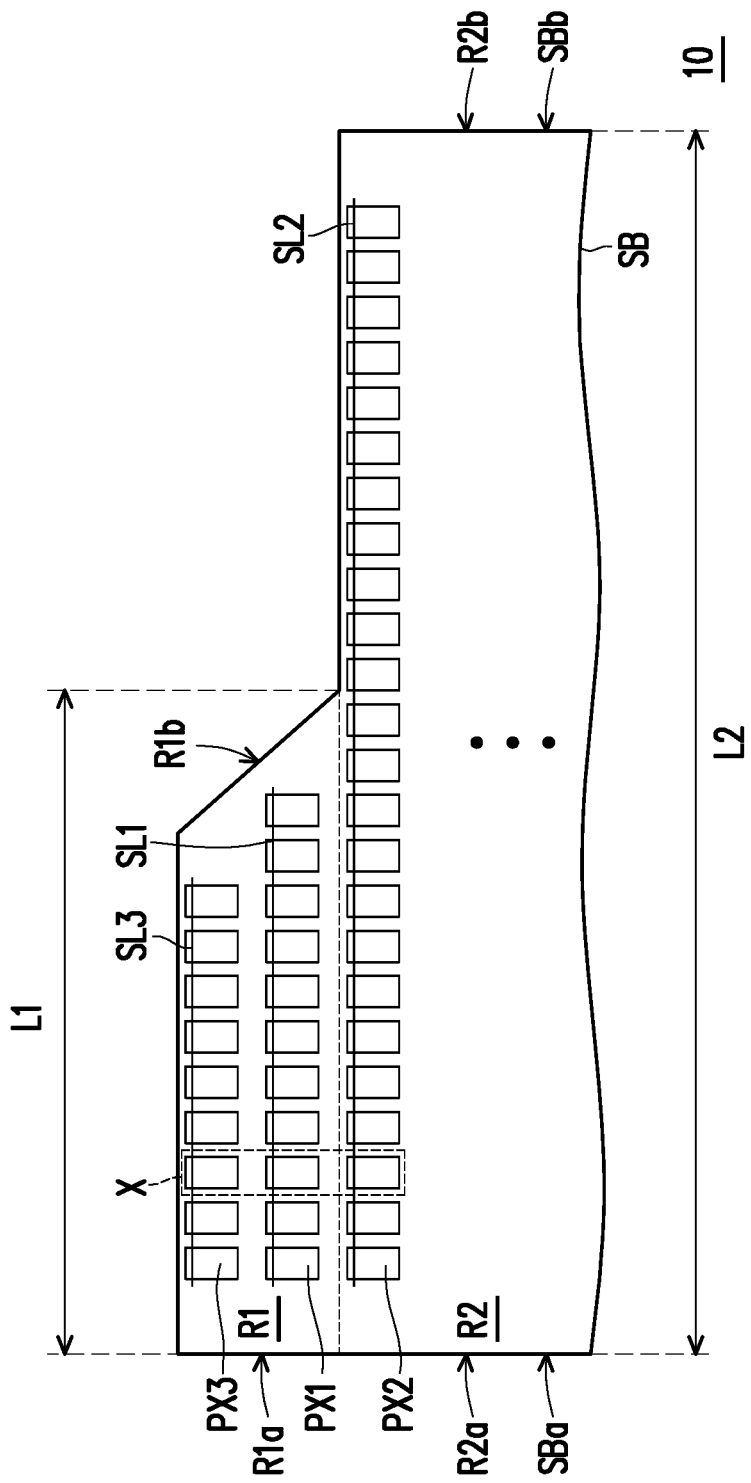
FIG. 1 is a top view of a pixel array substrate according to an embodiment of the invention.
Figure 2:
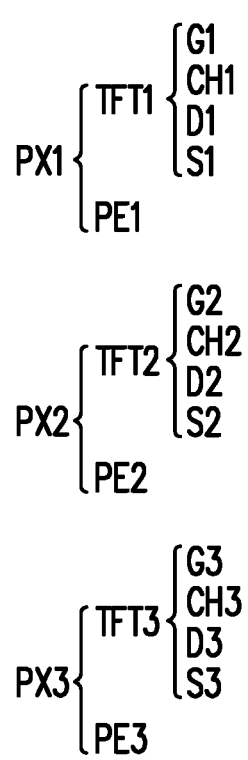
FIG. 2 is an enlarged view of a region X in FIG. 1.
Figure 2:
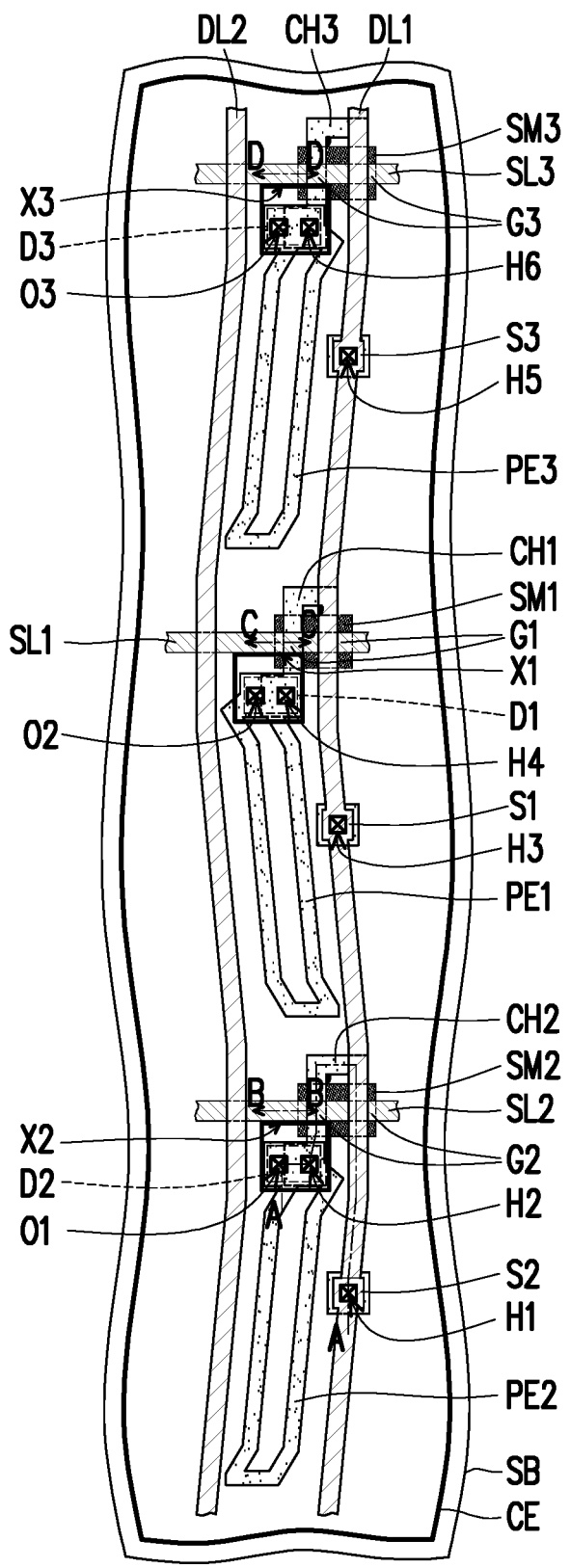

FIG. 1 is a top view of a pixel array substrate according to an embodiment of the invention, and in FIG. 1, a substrate SB, a first scan line SL1, first sub-pixels PX1, a second scan line SL2, second sub-pixels PX2, a third scan line SL3 and third sub-pixels PX3 are illustrated, and illustration of other components is omitted. FIG. 2 is an enlarged view of a region X in FIG. 1. FIG. 3A to FIG. 3D are partial cross-sectional views of a liquid crystal display panel according to an embodiment of the invention.

Figure 3A:
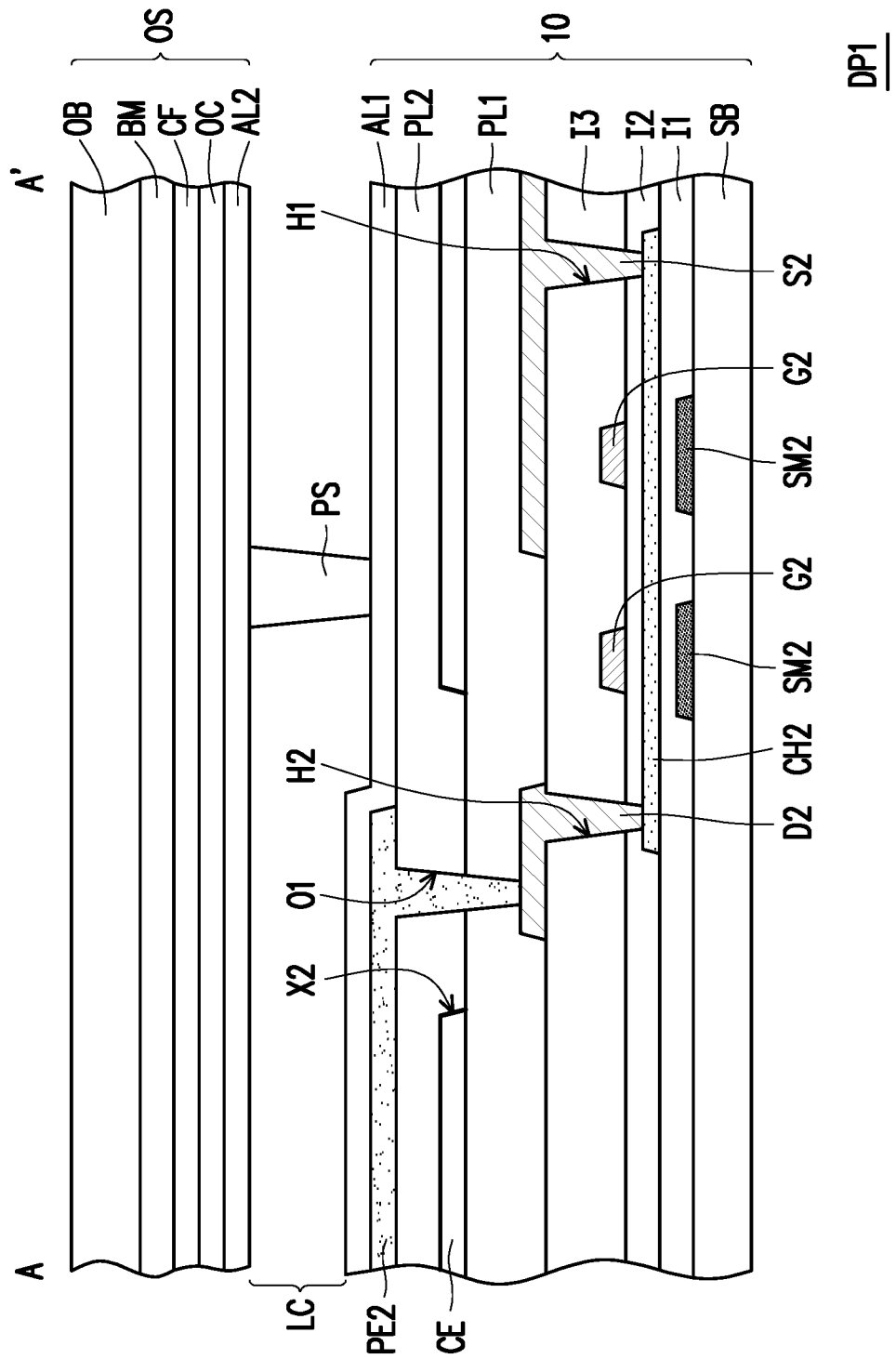
FIG. 3A to FIG. 3D are partial cross-sectional views of a liquid crystal display panel according to an embodiment of the invention.

Referring to FIG. 1, FIG. 2 and FIG. 3A, a partial cross-sectional schematic diagram illustrated along a sectional line A-A' of FIG. 2 is shown in FIG. 3A. The pixel array substrate 10 includes the substrate SB, the first scan line SL1, the first sub-pixels PX1, the second scan line SL2, the second sub-pixels PX2 and a common electrode CE. In some embodiments, the pixel array substrate 10 further includes a first data line DL1, a second data line DL2, the third scan line SL3, the third sub-pixels PX3, insulation layers I1-I3, a passivation layer PL1, a passivation layer PL2, an alignment layer AL1 and light shielding layers SM1-SM3. The liquid crystal display panel DP1 includes the pixel array substrate 10, a spacer PS, a liquid crystal layer LC and an opposite substrate OS, where the spacer PS and the liquid crystal layer LC are located between the pixel array substrate 10 and the opposite substrate OS. The opposite substrate OS includes a substrate OB, a black matrix BM, a filter element CF, a cover layer OC and an alignment layer AL2.

Referring to FIG. 1, the substrate SB is a non-rectangular, free-form substrate, and the substrate SB has a first region R1 and a second region R2. The length L1 of the first region R1 is smaller than the length L2 of the second region R2. Two opposite sides R2a, R2b of the second region R2 respectively correspond to two opposite sides SBa, SBb of the substrate SB. The two opposite sides SBa, SBb of the substrate SB are, for example, parallel to each other, though the invention is not limited thereto. At least one side of the first region R1 does not correspond to one of the two opposite sides of the substrate SB. For example, the side R1b of the first region R1 does not correspond to the side SBb of the substrate SB. For another example, one side R1a of the first region R1 corresponds to one side SBa of the substrate SB, and one side R1b of the first region R1 is not parallel with and not connected to the side SBb of the substrate SB. In the embodiment, one side R1a of the first region R1 is connected to one side R2a of the second region R2, and one side R1a of the first region R1 and one side R2a of the second region R2 together construct one side SBa of the substrate SB. One side R1b of the first region R1 is separated from one side R2b of the second region R2. In the embodiment, the second region R2 is substantially a rectangle and the first region R1 is substantially a trapezoid, and the bottom side of the first region R1 is connected to the second region R2, though the invention is not limited thereto. In other embodiments, the substrate SB may have other shapes.

The first scan line SL1 is located on the first region R1 of the substrate SB. The first sub-pixels PX1 in the same row are electrically connected to the first scan line SL1. The second scan line SL2 is located on the second region R2 of the substrate SB. The second sub-pixels PX2 in another row are electrically connected to the second scan line SL2. The third scan line SL3 is located on the first region R1 of the substrate SB. The third sub-pixels PX3 in still another row are electrically connected to the third scan line SL3. In the embodiment, the length of the first scan line SL1 is smaller than the length of the second scan line SL2, and the number of the second sub-pixels PX2 electrically connected to the second scan line SL2 is greater than the number of the first sub-pixels PX1 electrically connected to the first scan line SL1. In the embodiment, the length of the third scan line SL3 is smaller than the length of the first scan line SL1, and the number of the first sub-pixels PX1 electrically connected to the first scan line SL1 is greater than the number of the third sub-pixels PX3 electrically connected to the third scan line SL3.

Referring to FIG. 2 and FIG. 3A, the second sub-pixel PX2 includes a second thin-film transistor TFT2 and a second pixel electrode PE2. The second thin-film transistor TFT2 is located on the substrate SB, and includes a second semiconductor channel layer CH2, a second gate G2, a second source S2 and a second drain D2.

The second semiconductor channel layer CH2 is located on the substrate SB. In the embodiment, the light shielding layer SM2 is disposed between the second semiconductor channel layer CH2 and the substrate SB, and the insulation layer I1 is located between the second semiconductor channel layer CH2 and the light shielding layer SM2. The light shielding layer SM2 may mitigate a problem of current leakage of the second thin-film transistor TFT2 caused by light irradiation. The second gate G2 is overlapped with the second semiconductor channel layer CH2, and the insulation layer I2 is disposed between the second gate G2 and the second semiconductor channel layer CH2. The second gate G2 is electrically connected to the second scan line SL2. The second source S2 and the second drain D2 are electrically connected to the second semiconductor channel layer CH2. The insulation layer I3 is located on the second gate G2 and the second scan line SL2, and has a thickness of 0.6 μm to 0.9 μm. The second source S2 and the second drain D2 are located on the insulation layer I3, and are electrically connected to the second semiconductor channel layer CH2 through contact holes H1 and H2, respectively. The contact holes H1 and H2 are located in the insulation layer I3 and the insulation layer I2. The second source S2 is electrically connected to the first data line DL1. The passivation layer PL1 is located on the second source S2, the second drain D2 and the insulation layer I3, and a thickness thereof is 1.8 μm to 2.2 μm. The passivation layer PL1 covers the second thin-film transistor TFT2, and the passivation layer PL2 covers the passivation layer PL1. The second pixel electrode PE2 is electrically connected to the second drain D2 through a contact hole O1. The contact hole O1 is located in the passivation layer PL1 and the passivation layer PL2.

The first sub-pixel PX1 and the third sub-pixel PX3 have structures similar with that of the second sub-pixel PX2.

The first sub-pixel PX1 includes a first thin-film transistor TFT1 and a first pixel electrode PE1. The first thin-film transistor TFT1 is located on the substrate SB, and includes a first semiconductor channel layer CH1, a first gate G1, a first source S1 and a first drain D1.

The first semiconductor channel layer CH1 is located on the substrate SB. In the embodiment, the light shielding layer SM1 is disposed between the first semiconductor channel layer CH1 and the substrate SB, and the insulation layer I1 is located between the first semiconductor channel layer CH1 and the light shielding layer SM1. The light shielding layer SM1 may mitigate the problem of current leakage of the first thin-film transistor TFT1 caused by light irradiation. The first gate G1 is overlapped with the first semiconductor channel layer CH1, and the insulation layer I2 is disposed between the first gate G1 and the first semiconductor channel layer CH1. The first gate G1 is electrically connected to the first scan line SL1. The first source S1 and the first drain D1 are electrically connected to the first semiconductor channel layer CH1. The insulation layer I3 is located on the first gate G1 and the first scan line SL1. The first source S1 and the first drain D1 are located on the insulation layer I3, and are electrically connected to the first semiconductor channel layer CH1 through contact holes H3 and H4, respectively. The contact holes H3 and H4 are located in the insulation layer I3 and the insulation layer I2. The first source S1 is electrically connected to the first data line DL1. The first pixel electrode PE1 is electrically connected to the first drain D1. The passivation layer PL1 and the passivation layer PL2 cover the first thin-film transistor TFT1. The first pixel electrode PE1 is electrically connected to the first drain D1 through a contact hole O2. The contact hole O2 is located in the passivation layer PL1 and the passivation layer PL2.

The third sub-pixel PX3 includes a third thin-film transistor TFT3 and a third pixel electrode PE3. The third thin-film transistor TFT3 is located on the substrate SB, and includes a third semiconductor channel layer CH3, a third gate G3, a third source S3 and a third drain D3.

The third semiconductor channel layer CH3 is located on the substrate SB. In the embodiment, the light shielding layer SM3 is disposed between the third semiconductor channel layer CH3 and the substrate SB, and the insulation layer I1 is located between the third semiconductor channel layer CH3 and the light shielding layer SM3. The light shielding layer SM3 may mitigate the problem of current leakage of the third thin-film transistor TFT3 caused by light irradiation. The third gate G3 is overlapped with the third semiconductor channel layer CH3, and the insulation layer I2 is disposed between the third gate G3 and the third semiconductor channel layer CH3. The third gate G3 is electrically connected to the third scan line SL3. The third source S3 and the third drain D3 are electrically connected to the third semiconductor channel layer CH3. The insulation layer I3 is located on the third gate G3 and the third scan line SL3. The third source S3 and the third drain D3 are located on the insulation layer I3, and are electrically connected to the third semiconductor channel layer CH3 through contact holes H5 and H6, respectively. The contact holes H5 and H6 are located in the insulation layer I3 and the insulation layer I2. The third source S3 is electrically connected to the first data line DL1. The third pixel electrode PE3 is electrically connected to the third drain D3. The passivation layer PL1 and the passivation layer PL2 cover the third thin-film transistor TFT3. The third pixel electrode PE3 is electrically connected to the third drain D3 through a contact hole O3. The contact hole O3 is located in the passivation layer PL1 and the passivation layer PL2.

The invention is not limited to whether the first thin-film transistor TFT1, the second thin-film transistor TFT2 and the third thin-film transistor TFT3 are electrically connected to the same data line or different data lines. In the embodiment, the first thin-film transistor TFT1, the second thin-film transistor TFT2 and the third thin-film transistor TFT3 respectively included in the first sub-pixels PX1, the second sub-pixel PX2 and the third sub-pixel PX3 in the same column are, for example, electrically connected to the first data line DL1.

The common electrode CE is located on the substrate SB. The common electrode CE is located between the passivation layer PL1 and the passivation layer PL2. The common electrode CE is overlapped with the first pixel electrode PE1, the second pixel electrode PE2, the third pixel electrode PE3, the first scan line SL1, the second scan line SL2 and the third scan line SL3. In the embodiment, the common electrode CE has an opening X1, an opening X2 and an opening X3 respectively corresponding to the first thin-film transistor TFT1, the second thin-film transistor TFT2 and the third thin-film transistor TFT3, and the opening X1, the opening X2 and the opening X3 are respectively used for configuring the contact hole O2, the contact hole O1 and the contact hole O3.

The black matrix BM is located on the substrate OB, and shields the first scan line SL1, the second scan line SL2, the third scan line SL3, the first data line DL1, the second data line DL2, the first thin-film transistor TFT1, the second thin-film transistor TFT2 and the third thin-film transistor TFT3, though the invention is not limited thereto. Although the black matrix BM located on the substrate OB is taken as an example for description in the embodiment, the invention is not limited thereto. In other embodiments, the black matrix BM is located on the substrate SB, so that a structure of black matrix on array (BOA) is constructed.

The filter element CF is located on the black matrix BM, and the filter element CF, for example, includes a red filter pattern, a green filter pattern and a blue filter pattern. In some embodiments, the filter element CF may include other colors of filter pattern. In some embodiments, the black matrix BM is located between the filter patterns of different colors. In the embodiment, the cover layer OC covers a surface of the filter element CF, though the invention is not limited thereto. Although the filter element CF located on the substrate OB is taken as an example for description in the embodiment, the invention is not limited thereto. In other embodiments, the filter element CF may be located on the substrate SB, so that a structure of color filter on array (COA) is constructed.

In the embodiment, the alignment layer AL1 and the alignment layer AL2 are respectively located on the substrate SB and the substrate OB. The alignment layer AL1 covers the first pixel electrode PE1, the second pixel electrode PE2 and the third pixel electrode PE3. The alignment layer AL2 covers the cover layer OC. The material of the alignment layer AL1 and the alignment layer AL2 is, for example, polyimide (PI), thought the invention is not limited thereto.

In the embodiment, since the number of the third sub-pixels PX3 is smaller than the number of the first sub-pixels PX1, and the number of the first sub-pixels PX1 is smaller than the number of the second sub-pixels PX2, a total capacitance between the third sub-pixels PX3 and the third scan line SL3 is smaller than a total capacitance between the first sub-pixels PX1 and the first scan line SL1, and the total capacitance between the first sub-pixels PX1 and the first scan line SL1 is smaller than a total capacitance between the second sub-pixels PX2 and the second scan line SL2. In the embodiment, by adjusting a capacitance between the common electrode CE and the first scan line SL1 and a capacitance between the common electrode CE and the third scan line SL3 to compensate inconsistency of the total capacitance between the first sub-pixels PX1 and the first scan line SL1 and the total capacitance between the third sub-pixels PX3 and the third scan line SL3, the total capacitances formed at the regions respectively corresponding to the first scan line SL1, the second scan line SL2 and the third scan line SL3 are close to each other, so as to mitigate a problem of bright lines or a flicking phenomenon of the liquid crystal display panel DP1 occurred due to uneven capacitance distribution of the pixel array substrate 10, and details thereof are described later.

Figure 3B:
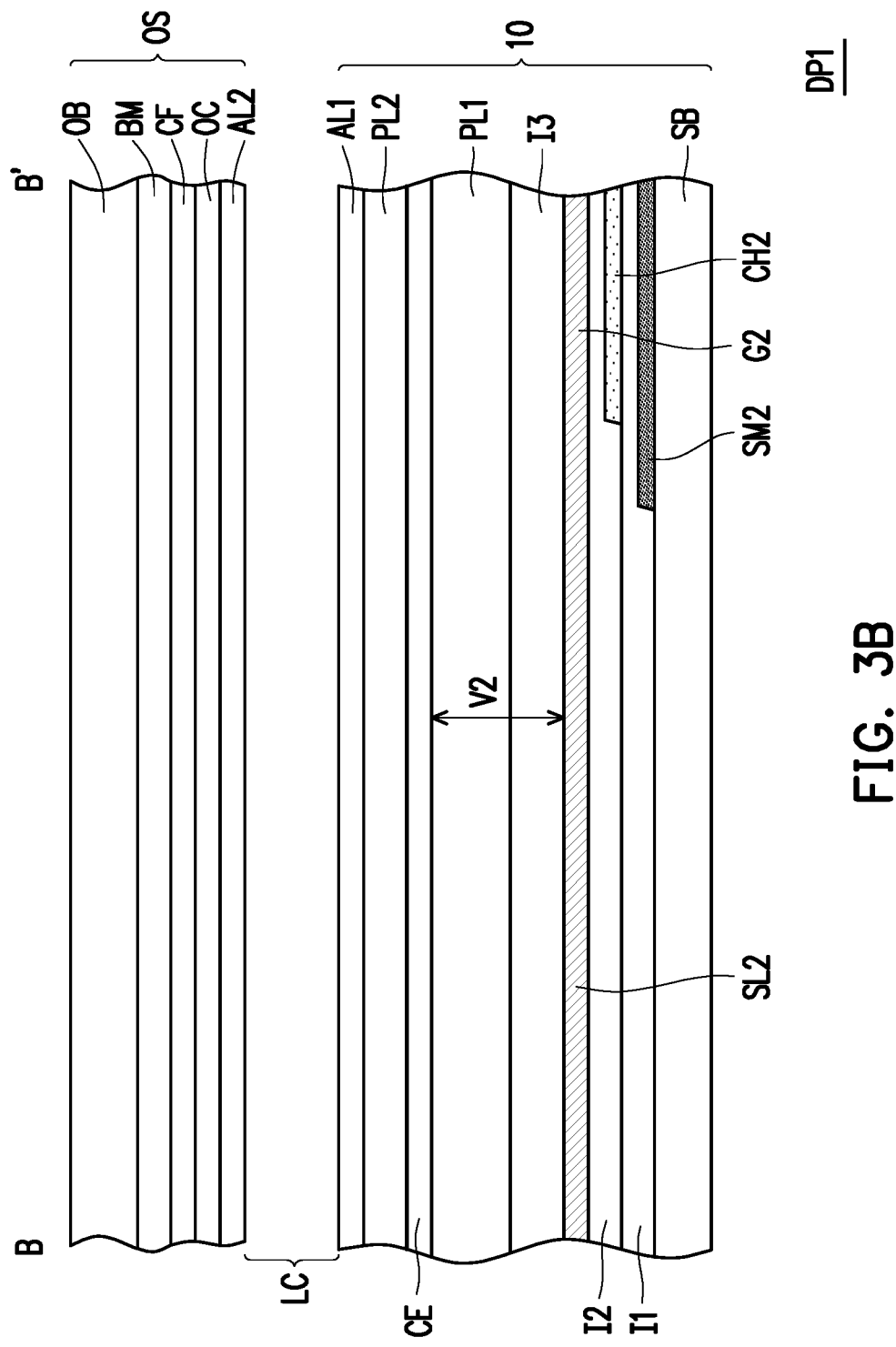
Figure 3C:
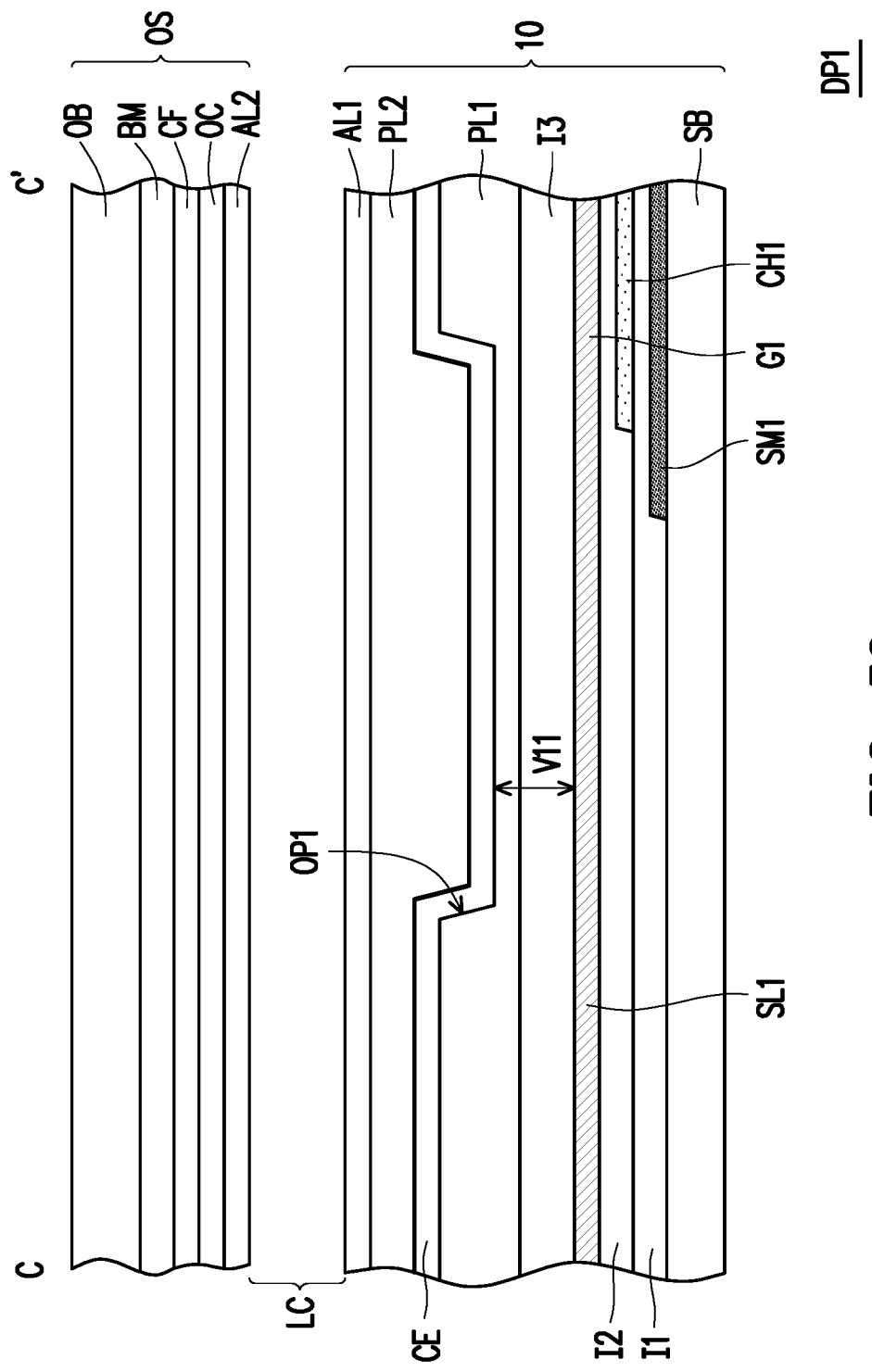
Figure 3D:
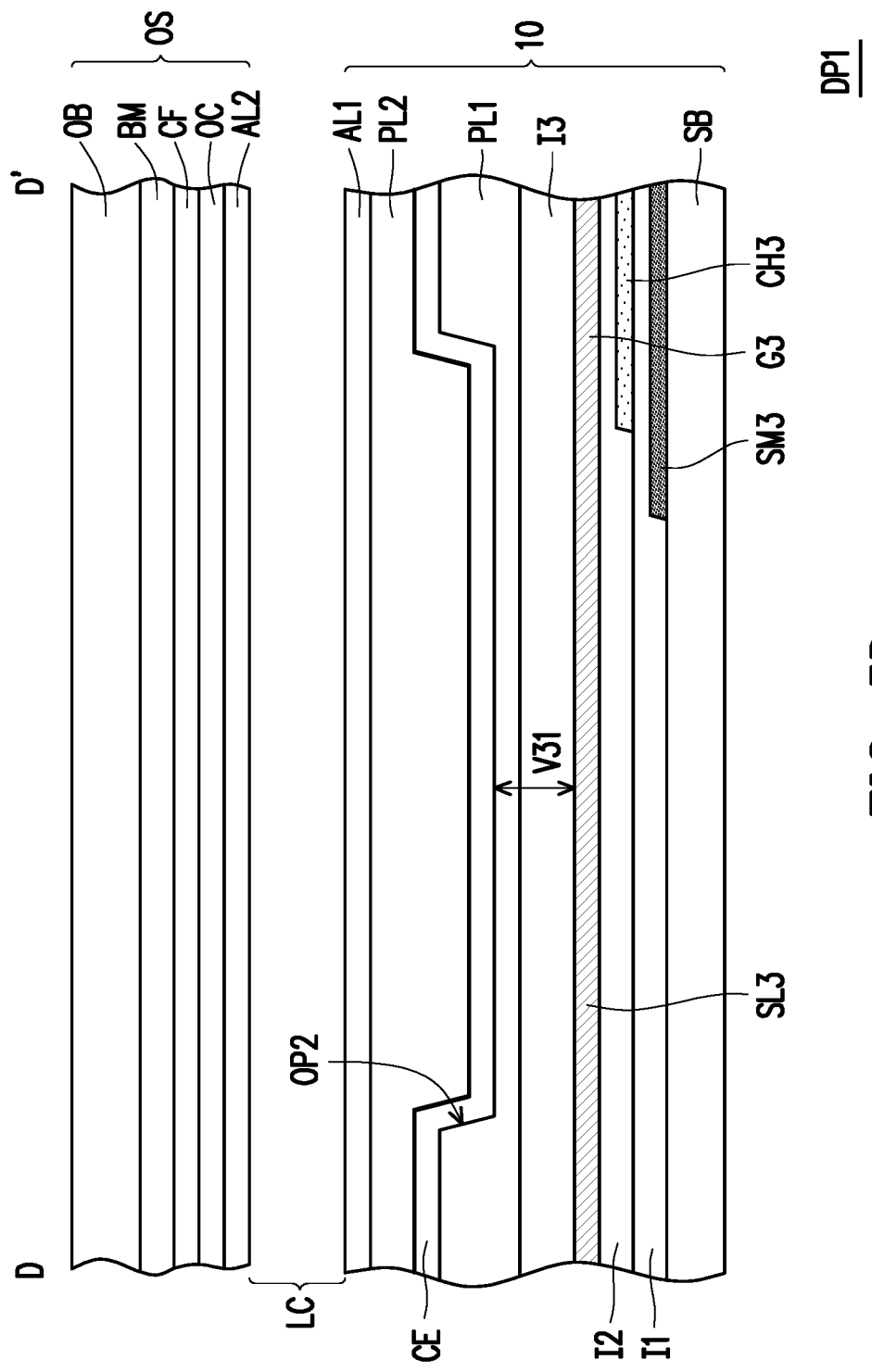

Referring to FIG. 1, FIG. 2 and FIGS. 3B-3D, a partial cross-sectional schematic diagram illustrated along a sectional line B-B' of FIG. 2 is shown in FIG. 3B, a partial cross-sectional schematic diagram illustrated along a sectional line C-C' of FIG. 2 is shown in FIG. 3C, and a partial cross-sectional schematic diagram illustrated along a sectional line D-D' of FIG. 2 is shown in FIG. 3D. In the embodiment, by changing a vertical distance V11 between the common electrode CE and the first scan line SL1 and a vertical distance V31 between the common electrode CE and the third scan line SL3, the capacitances of the first scan line SL1 and the second scan line SL3 are adjusted. In the embodiment, a vertical distance between the common electrode CE and the second scan line SL2 is V2, where $V2 > V11 \geq V31$.

Referring to FIG. 3C, the passivation layer PL1 has an open hole OP1, the open hole OP1 is overlapped with the first scan line SL1, a part of the common electrode CE is filled in the open hole OP1, and the vertical distance V11 between the common electrode CE and the first scan line SL1 corresponds to the open hole OP1. Referring to FIG. 3D, the passivation layer PL1 has an open hole OP2, the open hole OP2 is overlapped with the third scan line SL3, a part of the common electrode CE is filled in the open hole OP2, and the vertical distance V31 between the common electrode CE and the third scan line SL3 corresponds to the open hole OP2. In the embodiment, the open hole OP1 and the open hole OP2 do not penetrate through the passivation layer PL1, though the invention is not limited thereto.

In the embodiment, the capacitances of the first scan line SL1 and the third scan line SL3 are adjusted by adjusting vertical projection areas (areas vertically projected on the substrate SB) of the open hole OP1 and the open hole OP2. The vertical projection area of the open hole OP2 may be greater than or equal to the vertical projection area of the open hole OP1. In the embodiment, the vertical projection area of the open hole OP2 is greater than the vertical projection area of the open hole OP1, so that the capacitance between the common electrode CE and the third scan line SL3 is greater than the capacitance between the common electrode CE and the first scan line SL1. Thereby, the inconsistency of the total capacitance between the first sub-pixels PX1 and the first scan line SL1 and the total capacitance between the third sub-pixels PX3 and the third scan line SL3 is compensated, so that the total capacitances formed at the regions respectively corresponding to the first scan line SL1, the second scan line SL2 and the third scan line SL3 are close to each other, so as to mitigate the problem of bright lines or the flicking phenomenon of the liquid crystal display panel DP1 occurred due to uneven capacitance distribution of the pixel array substrate 10.

The number of the opening OP1 and the number of the opening OP2 may be adjusted according to an actual requirement, which means that the passivation layer PL1 may have one open hole OP1 or a plurality of open holes OP1, and the passivation layer PL1 may have one open hole OP2 or a plurality of open holes OP2. The capacitance between the common electrode CE and the first scan line SL1 may be increased by increasing the number of the opening OP1, and the capacitance between the common electrode CE and the third scan line SL3 may be increased by increasing the number of the opening OP2.

Figure 4A:
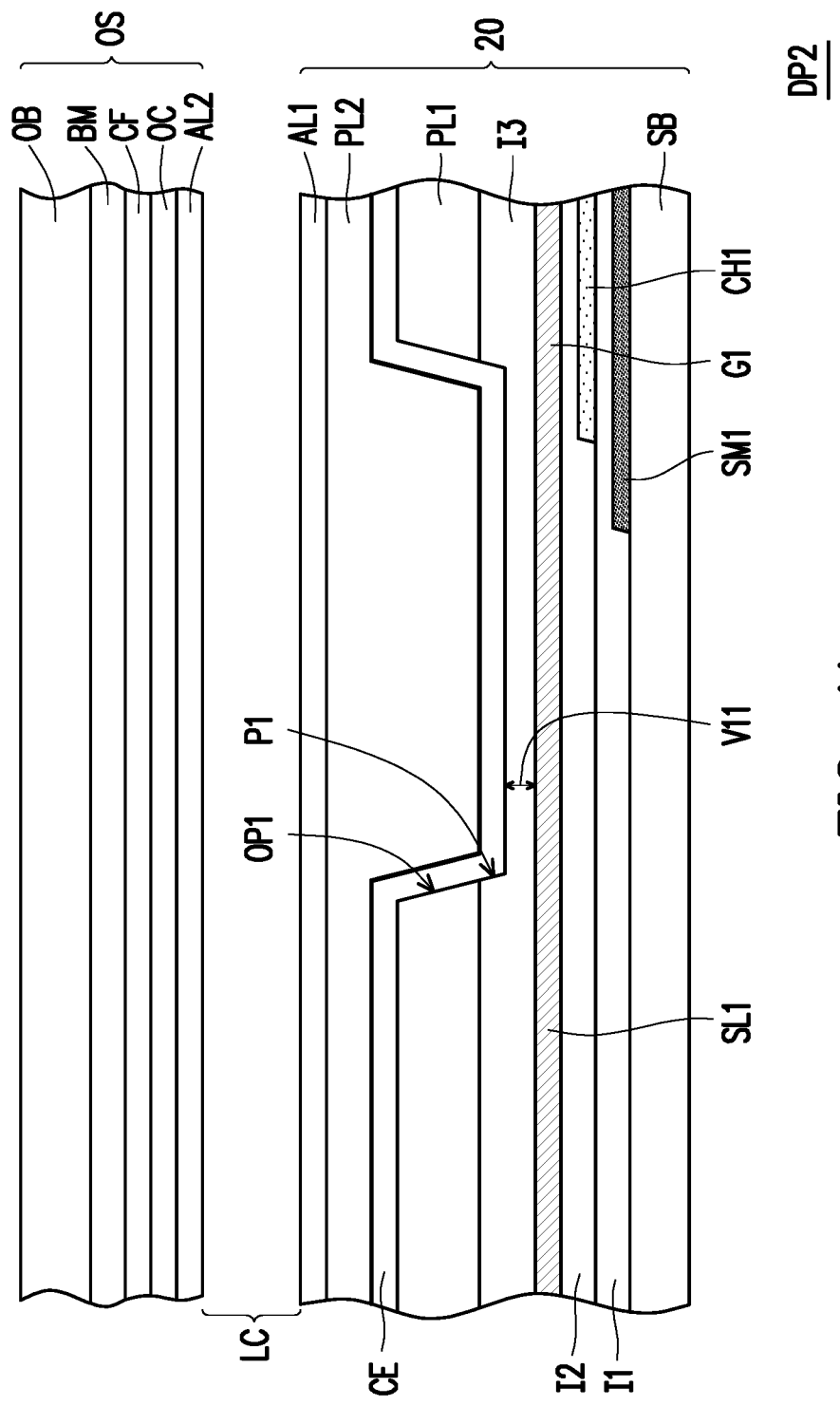
FIG. 4A to FIG. 4B are partial cross-sectional views of a liquid crystal display panel according to an embodiment of the invention.
Figure 4B:
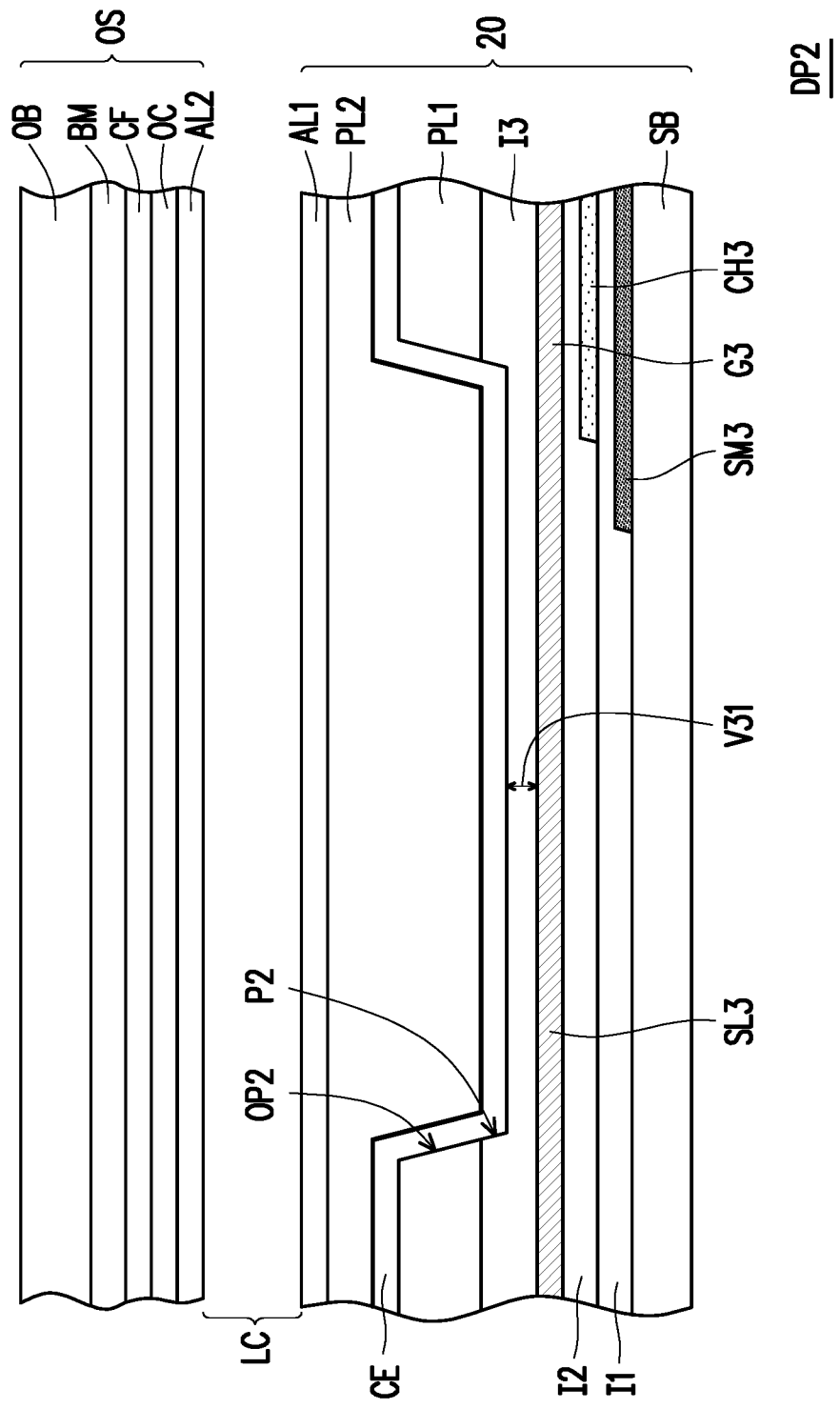

FIG. 4A to FIG. 4B are partial cross-sectional views of a liquid crystal display panel according to an embodiment of the invention. It should be noted that reference numbers of the components and a part of contents of the embodiment of FIG. 3B and FIG. 3C are also adopted in the embodiment of FIG. 4A and FIG. 4B, where the same or similar elements are represented by the same or similar reference numbers, and descriptions of the same technical contents are omitted. The aforementioned embodiment may be referred for descriptions of the omitted parts, and detailed descriptions thereof are not repeated in the following embodiment.

A main difference between the pixel array substrate 20 of the liquid crystal display panel DP2 and the pixel array substrate 10 of the liquid crystal display panel DP1 is that: in the pixel array substrate 20, the insulation layer I3 has an opening P1 and an opening P2.

Referring to FIG. 4A and FIG. 4B, the insulation layer I3 has the opening P1 and the opening P2, and the opening P1 and the opening P2 do not penetrate through the insulation layer I3. The open hole OP1 and the open hole OP2 penetrates through the passivation layer PL1, the opening P1 is overlapped with the open hole OP1, and the opening P2 is overlapped with the open hole OP2, where a part of the common electrode CE is filled in the opening P1, and a part of the common electrode CE is filled in the opening P2.

In some embodiment, the open hole OP1, the open hole OP2, the opening P1 and the opening P2 may be defined by the same optical mask, though the invention is not limited thereto.

By configuring the opening P1 and the opening P2 in the insulation layer I3, the capacitance between the common electrode CE and the first scan line SL1 and the capacitance between the common electrode CE and the third scan line SL3 are further adjusted.

Figure 5A:
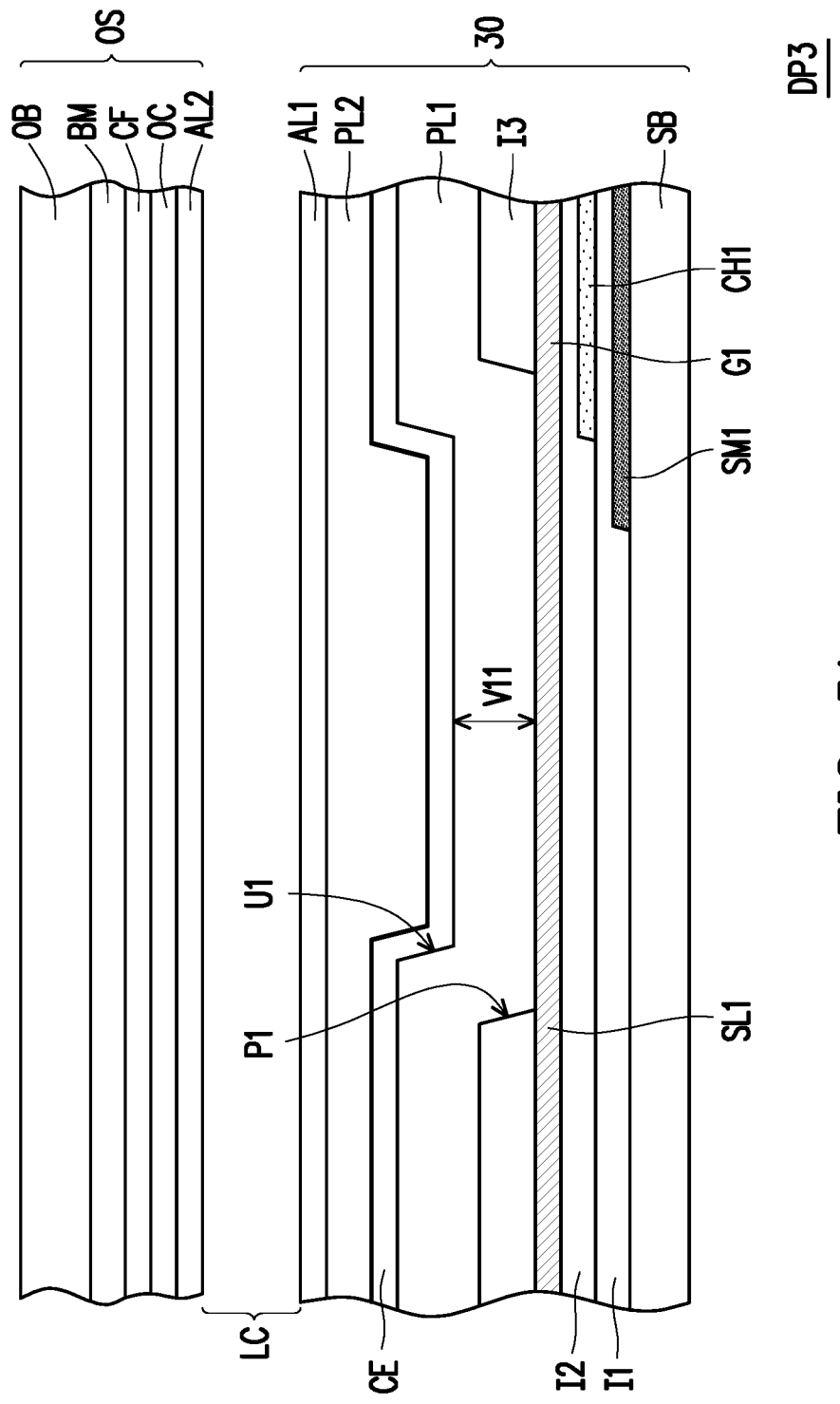
FIG. 5A to FIG. 5B are partial cross-sectional views of a liquid crystal display panel according to an embodiment of the invention.
Figure 5B:
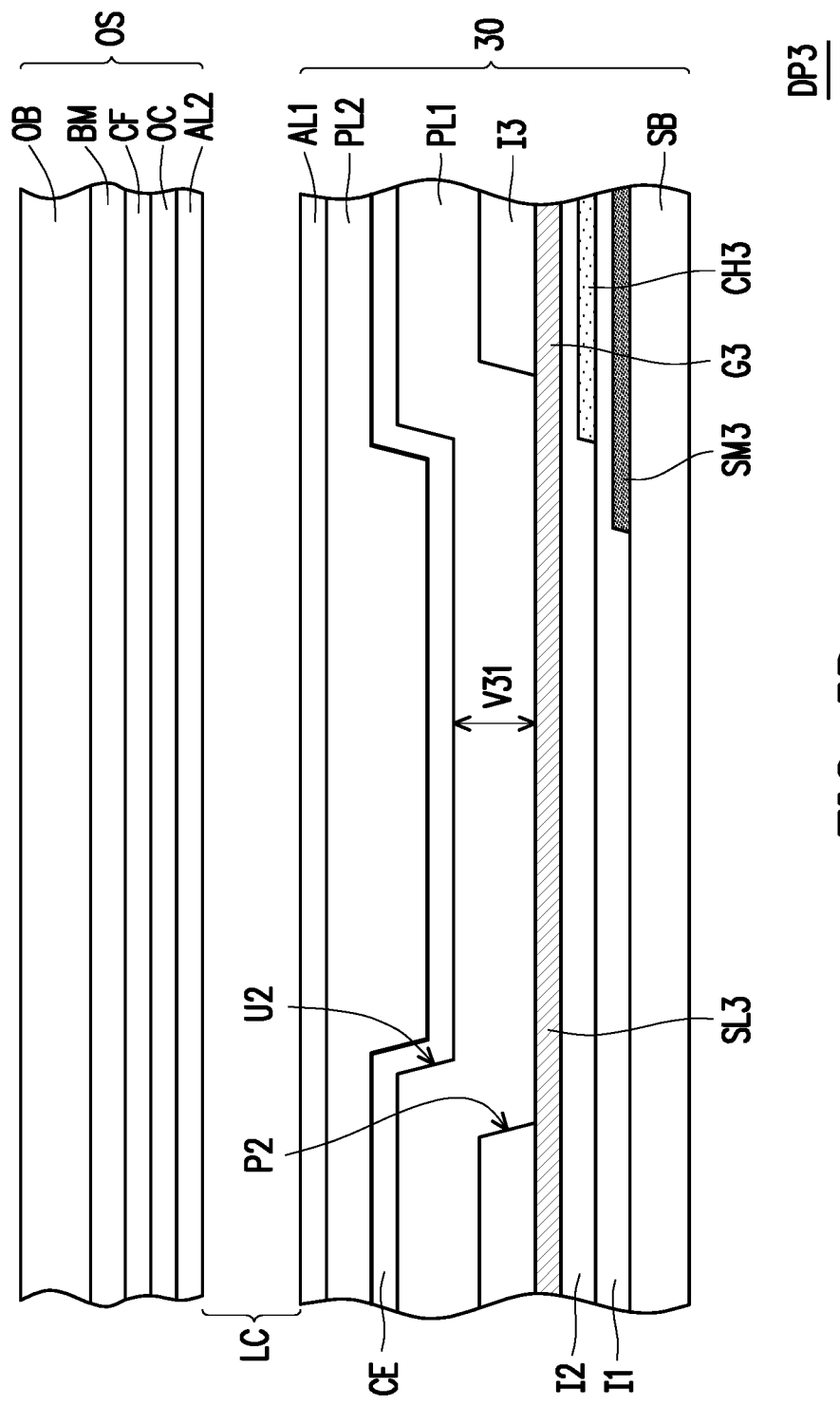

FIG. 5A to FIG. 5B are partial cross-sectional views of a liquid crystal display panel according to an embodiment of the invention. It should be noted that reference numbers of the components and a part of contents of the embodiment of FIG. 4A and FIG. 4B are also adopted in the embodiment of FIG. 5A and FIG. 5B, where the same or similar elements are represented by the same or similar reference numbers, and descriptions of the same technical contents are omitted. The aforementioned embodiment may be referred for descriptions of the omitted parts, and detailed descriptions thereof are not repeated in the following embodiment.

A main difference between the pixel array substrate 30 of the liquid crystal display panel DP3 and the pixel array substrate 20 of the liquid crystal display panel DP2 is that: in the pixel array substrate 30, the opening P1 and the opening P2 penetrate through the insulation layer I3.

Referring to FIG. 5A and FIG. 5B, the insulation layer I3 has the opening P1 and the opening P2, and the opening P1 and the opening P2 penetrate through the insulation layer I3. The passivation layer PL1 is filled in the opening P1 and the opening P2, and a surface of the passivation layer PL1 has a groove U1 and a groove U2 respectively corresponding to the opening P1 and the opening P2. In some embodiment, since the passivation layer PL1 may be conformed to the opening P1 and the opening P2 of the insulation layer I3, the groove U1 and the groove U2 may be generated on the surface of the passivation layer PL1 without performing an itching process to the passivation layer PL1.

By configuring the groove U1 and the groove U2 on the surface of the passivation layer PL1, the capacitance between the common electrode CE and the first scan line SL1 and the capacitance between the common electrode CE and the third scan line SL3 are further adjusted.

Figure 6:
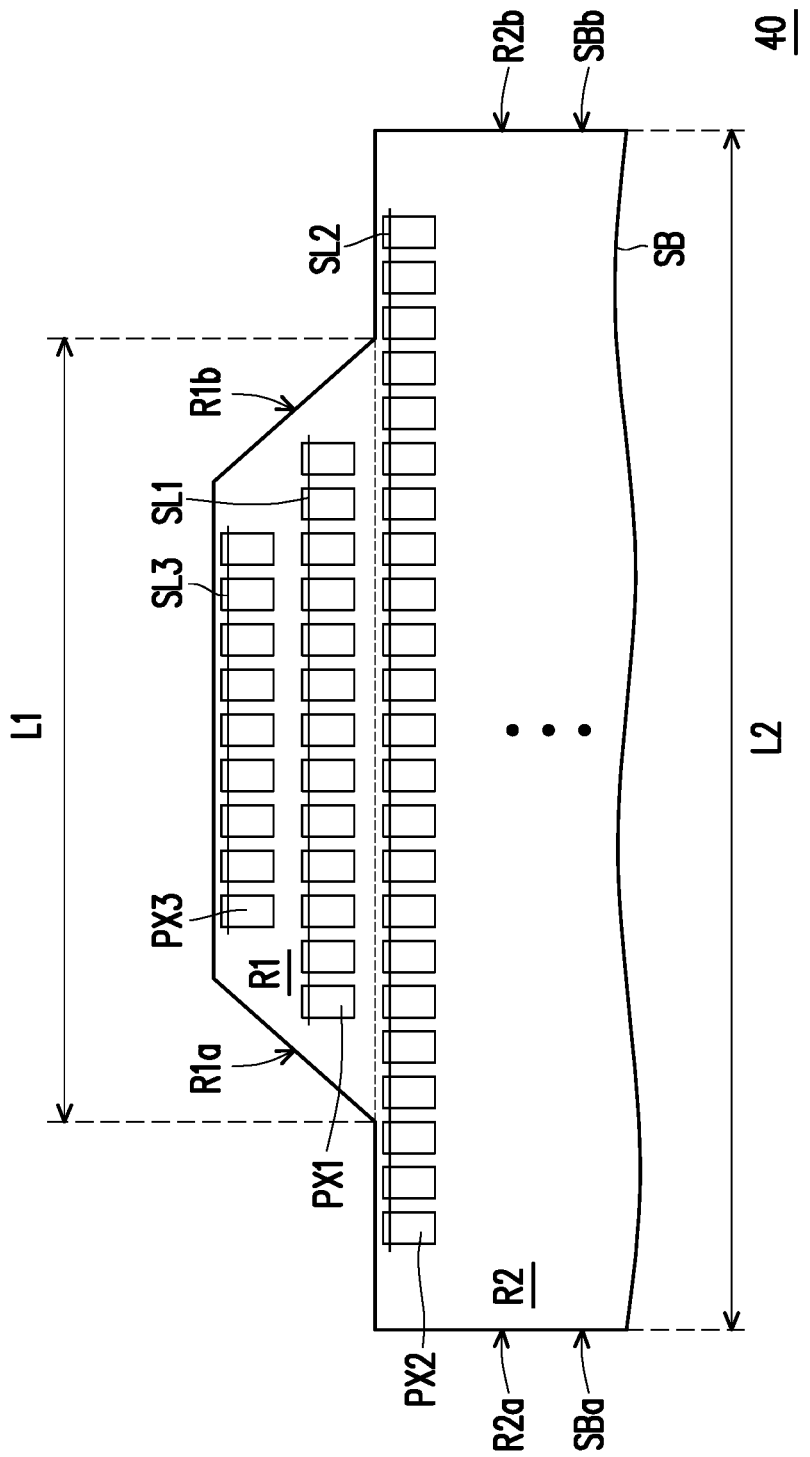
FIG. 6 is a top view of a pixel array substrate according to an embodiment of the invention.

FIG. 6 is a top view of a pixel array substrate according to an embodiment of the invention. It should be noted that reference numbers of the components and a part of contents of the embodiment of FIG. 1 are also adopted in the embodiment of FIG. 6, where the same or similar elements are represented by the same or similar reference numbers, and descriptions of the same technical contents are omitted. The aforementioned embodiment may be referred for descriptions of the omitted parts, and detailed descriptions thereof are not repeated in the following embodiment.

A main difference between the pixel array substrate 40 of FIG. 6 and the pixel array substrate 10 of FIG. 1 is that: in the pixel array substrate 40, the two opposite sides R1a, R1b of the first region R1 of the substrate SB do not correspond to the two opposite sides SBa, SBb of the substrate SB. In the embodiment, the two opposite sides R1a, R1b of the first region R1 are separated from and not connected to the two opposite sides R2a, R2b of the second region R2.

By adjusting the capacitance between the common electrode CE and the first scan line SL1 and the capacitance between the common electrode CE and the third scan line SL3, a total capacitance formed at the region corresponding to the first scan line SL1, a total capacitance formed at the region corresponding to the second scan line SL2, and a total capacitance formed at the region corresponding to the third scan line SL3 are close to each other, so as to mitigate the problem of bright lines or a flicking phenomenon of the liquid crystal display panel occurred due to uneven capacitance distribution of the pixel array substrate 40.

Figure 7:
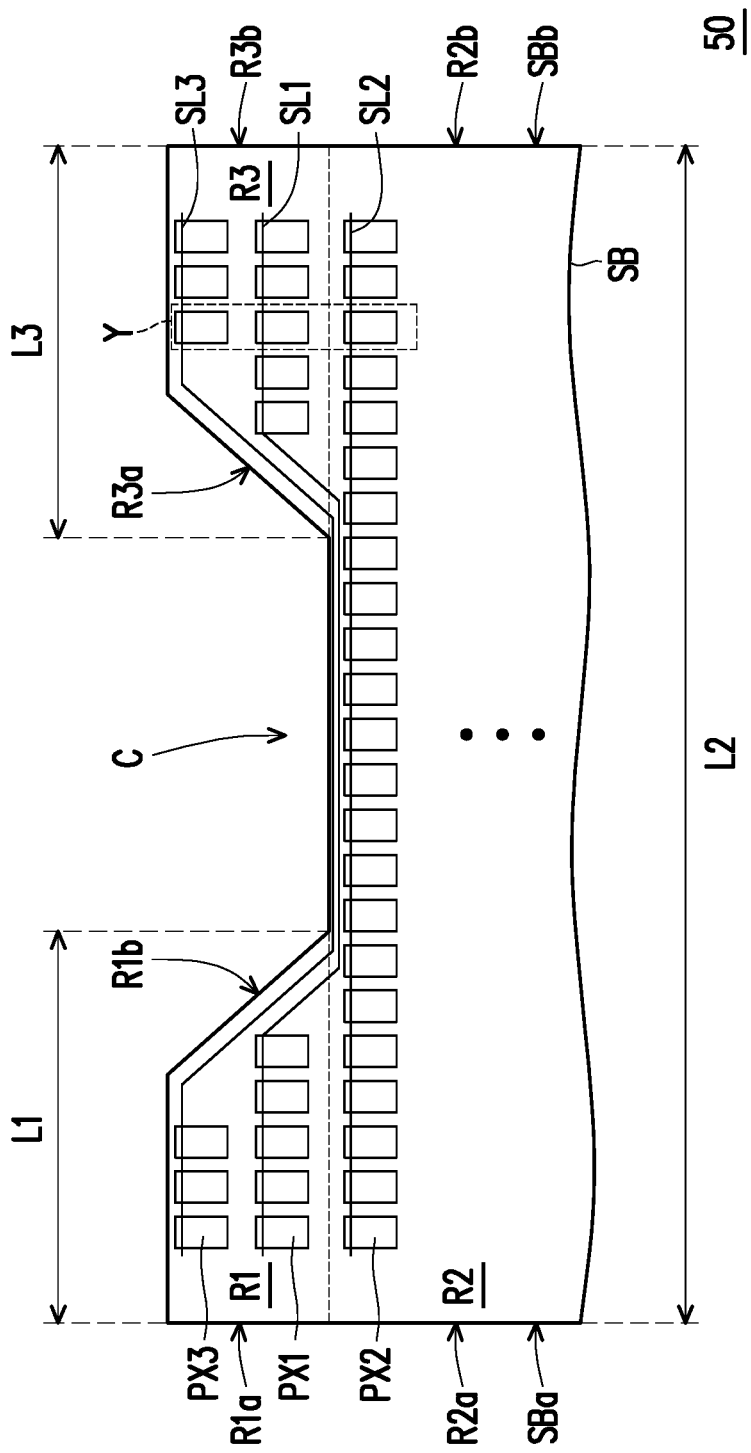
FIG. 7 is a top view of a pixel array substrate according to an embodiment of the invention.
Figure 8:
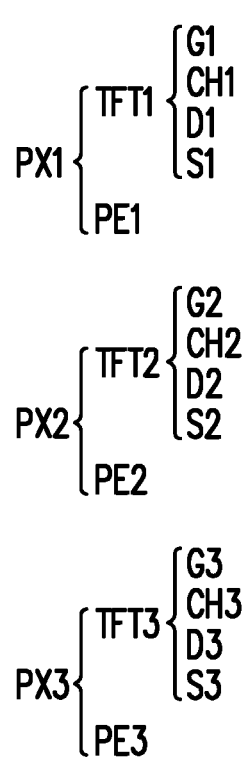
FIG. 8 is an enlarged view of a region Y in FIG. 7.
Figure 8:
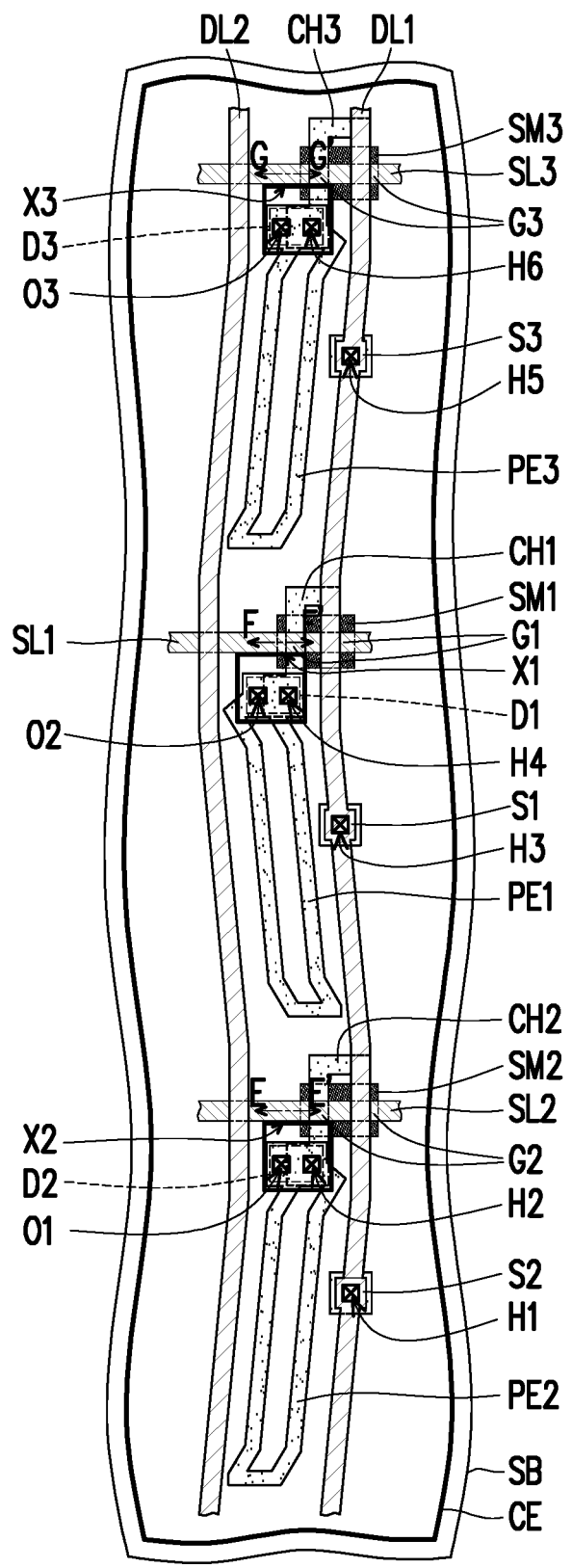
Figure 9A:
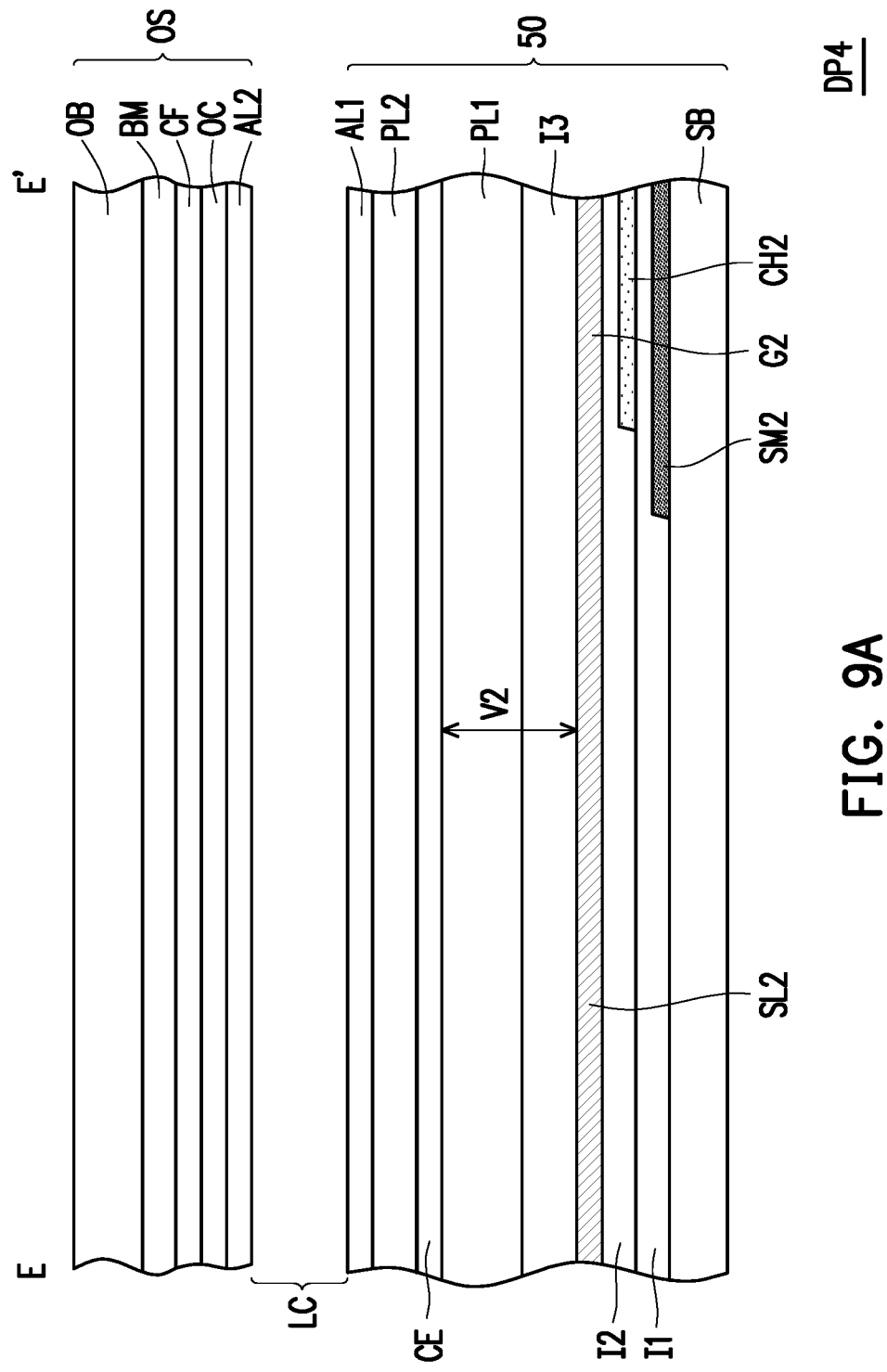
FIG. 9A to FIG. 9C are partial cross-sectional views of a liquid crystal display panel according to an embodiment of the invention.
Figure 9B:
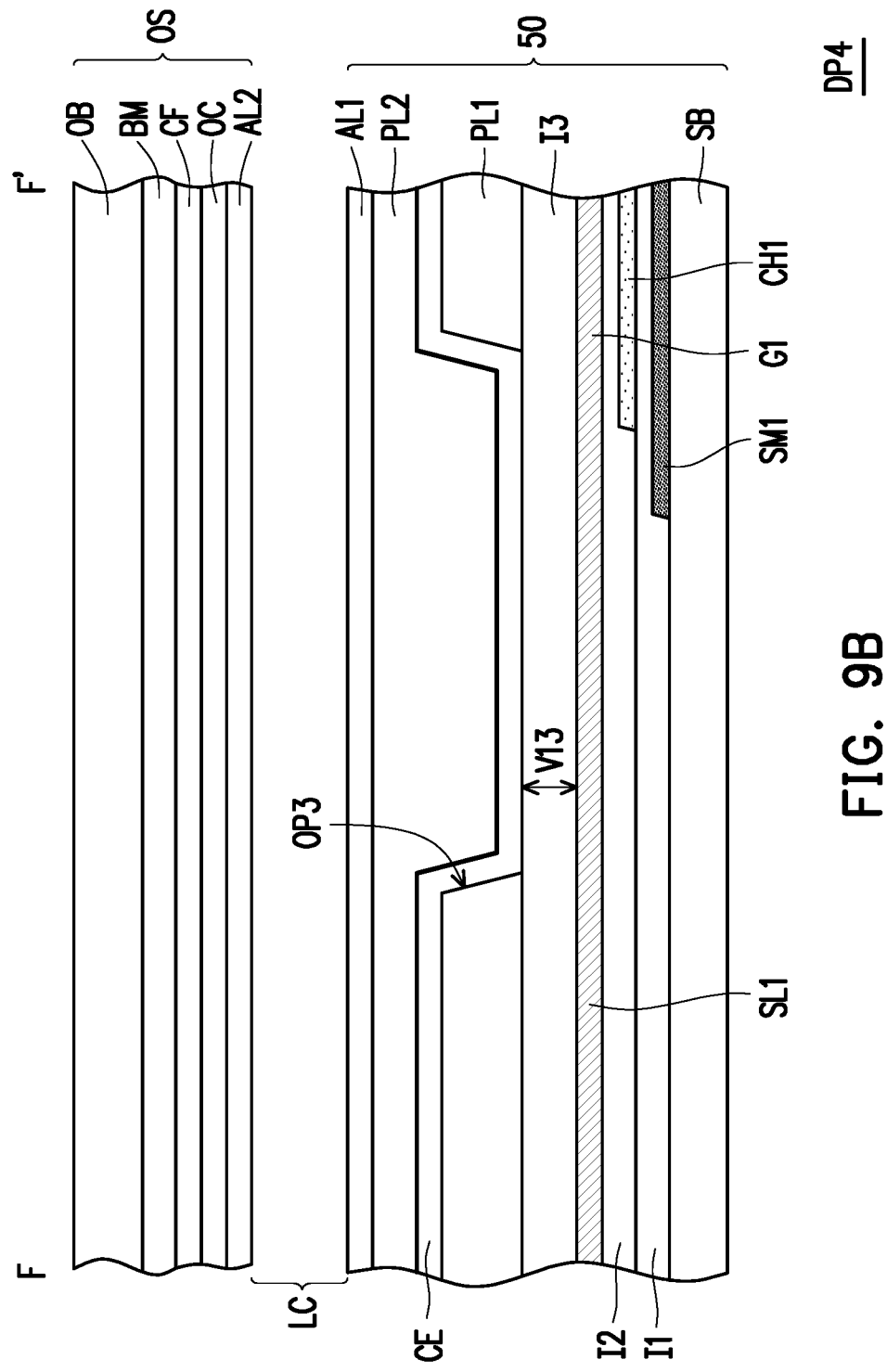
Figure 9C:
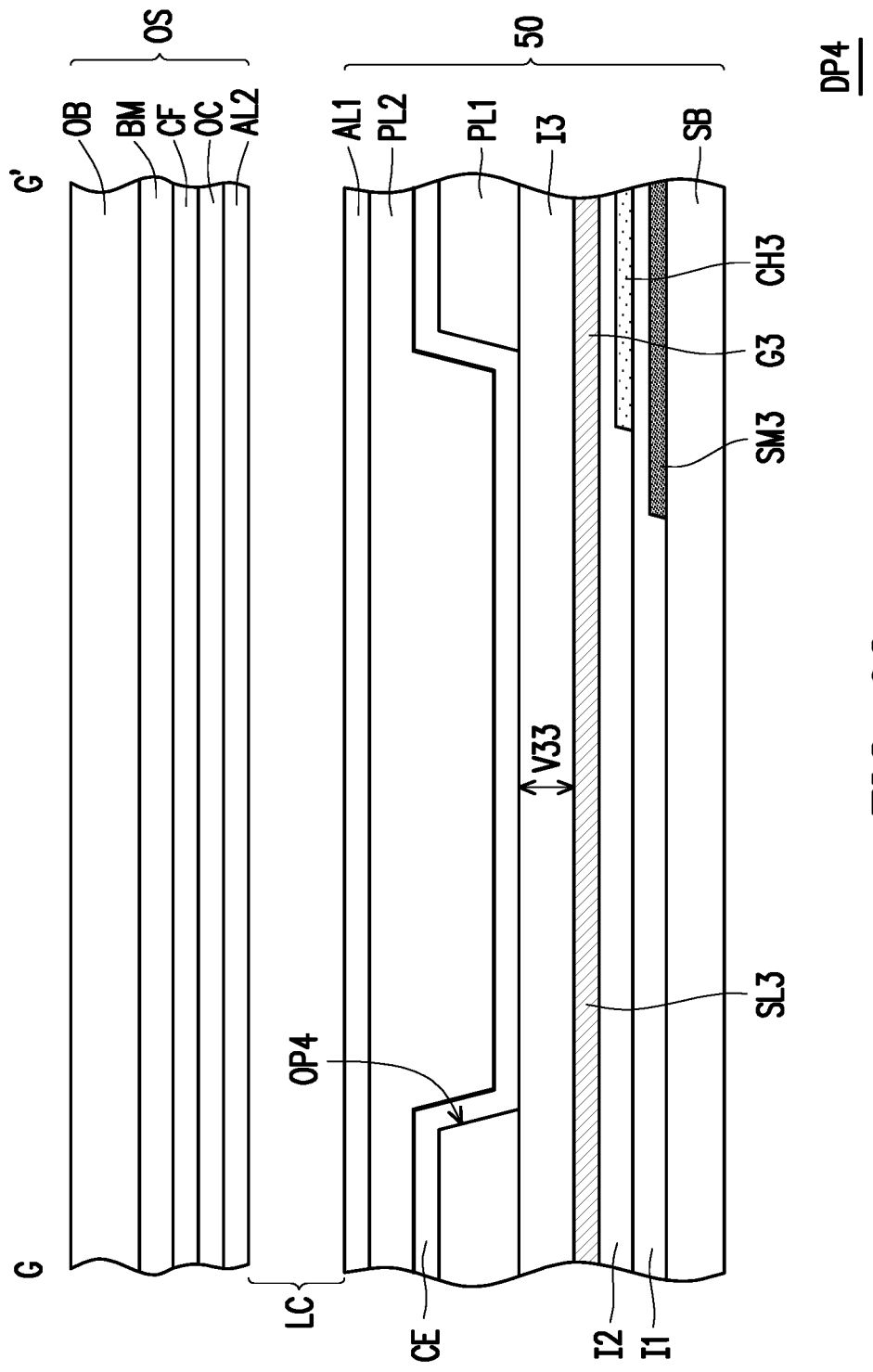

FIG. 7 is a top view of a pixel array substrate according to an embodiment of the invention. FIG. 8 is an enlarged view of a region Y in FIG. 7. FIG. 9A to FIG. 9C are partial cross-sectional views of a liquid crystal display panel according to an embodiment of the invention. It should be noted that reference numbers of the components and a part of contents of the embodiments of FIG. 1, FIG. 2, FIG. 3B to FIG. 3D are also adopted in the embodiments of FIG. 7 to FIG. 9C, where the same or similar elements are represented by the same or similar reference numbers, and descriptions of the same technical contents are omitted. The aforementioned embodiment may be referred for descriptions of the omitted parts, and detailed descriptions thereof are not repeated in the following embodiment.

A partial cross-sectional schematic diagram illustrated along a sectional line E-E' of FIG. 8 is shown in FIG. 9A, a partial cross-sectional schematic diagram illustrated along a sectional line F-F' of FIG. 8 is shown in FIG. 9B, and a partial cross-sectional schematic diagram illustrated along a sectional line G-G' of FIG. 8 is shown in FIG. 9C. A main difference between the pixel array substrate 50 of FIG. 7 and the pixel array substrate 10 of FIG. 1 is that: the substrate SB of the pixel array substrate 50 further has a third region R3. The third region R3 is connected to the second region R2, and a notch C is formed between the first region R1 and the third region R3.

Referring to FIG. 7 to FIG. 9C, the length L3 of the third region R3 is smaller than the length L2 of the second region R2. The third region R3 has two opposite sides R3a, R3b. At least one side of the third region R3 does not correspond to one of the two opposite sides of the substrate SB. For example, the side R3a of the third region R3 does not correspond to the side SBa of the substrate SB. In the embodiment, one side R3b of the third region R3 is connected to one side R2b of the second region R2 to construct one side SBb of the substrate SB. One side R3a of the third region R3 is separated from one side R2a of the second region R2. In the embodiment, the third region R3 is substantially a trapezoid, and a bottom side of the third region R3 is connected to the second region R2, though the invention is not limited thereto. The notch C is, for example, defined by the first region R1, the second region R2 and the third region R3.

Referring to FIG. 3C to FIG. 3D, and FIG. 9B to FIG. 9C, a vertical distance between the common electrode CE and the first scan line SL1 on the first region R1 of the pixel array substrate 50 of the liquid crystal display panel DP4 is V11. A vertical distance between the third scan line SL3 and the common electrode CE on the first region R1 is V31. The first scan line SL1 extends to the third region R3, and a vertical distance between the first scan line SL1 and the common electrode CE on the third region R3 is V13. The third scan line SL3 extends to the third region R3, and a vertical distance between the third scan line SL3 and the common electrode CE on the third region R3 is V33.

In the embodiment, the passivation layer PL1 on the third region R3 has an open hole OP3, and the open hole OP3 is overlapped with the first scan line SL1, where a part of the common electrode CE is filled in the open hole OP3, and the vertical distance V13 between the common electrode CE and the first scan line SL1 on the third region R3 corresponds to the open hole OP3. In the embodiment, the passivation layer PL1 on the third region has an open hole OP4, and the open hole OP4 is overlapped with the third scan line SL3, where a part of the common electrode CE is filled in the open hole OP4, and the vertical distance V33 between the common electrode CE and the third scan line SL3 on the third region R3 corresponds to the open hole OP4.

In the embodiment, as shown in FIG. 7, the first scan line SL1 and the third scan line SL3 extend from the first region R1 towards the third region R3, and are bent along at least a part of a contour of the notch C. In some embodiments, the first region R1 is closer to a signal source (or a driving circuit) of the first scan line SL1 and the third scan line SL3 compared to the third region R3. In other words, signals of the first scan line SL1, the third scan line SL3 first reach the first region R1 and then reach the third region R3, through the invention is not limited thereto.

On the first region R1 close to the signal source, an attenuation amplitude of the signals (for example, voltage) of the first scan line SL1 and the third scan line SL3 is substantially the same as a attenuation amplitude of the signal of a part of the second scan line SL2 close to the first region R1.

The first scan line SL1 and the third scan line SL3 are not connected to the first sub-pixel PX1 and the third sub-pixel PX3 at a position close to the notch C between the first region R1 and the third region R3, while the second scan line SL2 is connected to the second sub-pixels PX2 at the position close to the notch C, so that after the signal is transmitted to a location near to the notch C and then enters the third region R3, the attenuation amplitude of the signals (for example, the voltage) of the first scan line SL1 and the third scan line SL3 is obviously smaller than the attenuation amplitude of the signal of a part of the second scan line SL2 close to the third region R3. In other words, when the signal is transmitted to a part of the second scan line SL2 close to the third region R3, since the signal passes through more second sub-pixels PX2, the signal attenuation amplitude thereof is obvious than that of the first scan line SL1 and the third scan line SL3.

By reducing the vertical distance V13 between the first scan line SL1 and the common electrode CE on the third region R3 and the vertical distance V33 between the third scan line SL3 and the common electrode CE on the third region R3, the problem of bright lines caused by signal attenuation is resolved. In a preferable embodiment, V11≥V13. In a preferable embodiment, V31≥V33.

Figure 10:
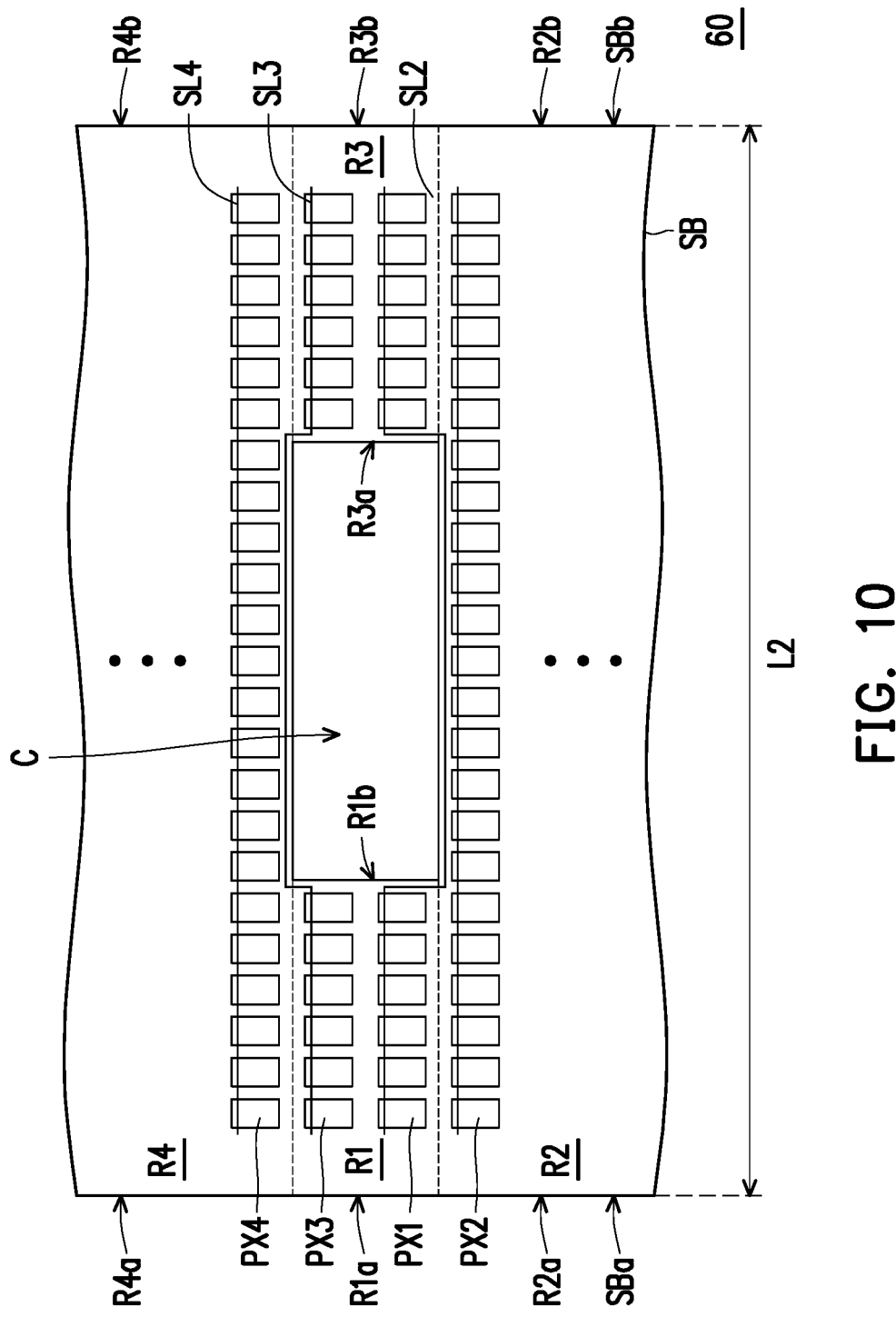
FIG. 10 is a top view of a pixel array substrate according to an embodiment of the invention.

FIG. 10 is a top view of a pixel array substrate according to an embodiment of the invention. It should be noted that reference numbers of the components and a part of contents of the embodiment of FIG. 7 are also adopted in the embodiment of FIG. 10, where the same or similar elements are represented by the same or similar reference numbers, and descriptions of the same technical contents are omitted. The aforementioned embodiment may be referred for descriptions of the omitted parts, and detailed descriptions thereof are not repeated in the following embodiment.

A main difference between the pixel array substrate 60 of FIG. 10 and the pixel array substrate 40 of FIG. 7 is that: the substrate SB of the pixel array substrate 60 further has a fourth region R4. The fourth region R4 is connected to the first region R1 and the third region R3.

In the embodiment, the notch C is located in the substrate SB and is a hole with a closed contour, the fourth region R4 and the second region R2 are respectively located at two sides of the notch C, and the first region R1 and the third region R3 are respectively located at two other sides of the notch C. The notch C is, for example, defined by the first region R1, the second region R2, the third region R3 and the fourth region R4.

The fourth region R4 has two opposite sides R4a and R4b. The two opposite sides R4a and R4b of the fourth region R4 respectively correspond to the two opposite sides SBa, SBb of the substrate SB.

In the embodiment, the pixel array substrate 60 further includes a fourth scan line SL4 and a plurality of fourth sub-pixels PX4 electrically connected to the fourth scan line SL4, though the invention is not limited thereto. The fourth sub-pixels PX4 have similar structures with that of the second sub-pixels PX2, and detail thereof is not repeated.

In the embodiment, the number of the fourth sub-pixels PX4 is equal to the number of the second sub-pixels PX2, though the invention is not limited thereto.

In summary, in at least one embodiment of the invention, the capacitances between the common electrode and different scan lines are adjusted to compensate inconsistency of the total capacitances between a plurality of sub-pixels and the various scan lines, such that the total capacitances formed at the regions corresponding to each of the scan lines are close to each other, so as to mitigate the problem of bright lines or the flicking phenomenon of the liquid crystal display panel occurred due to uneven capacitance distribution of the pixel array substrate.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A pixel array substrate, comprising:
a substrate, having a first region and a second region, wherein a length of the first region is smaller than a length of the second region, two opposite sides of the second region respectively correspond to two opposite sides of the substrate, and at least one side of the first region does not correspond to one of the two opposite sides of the substrate;
a first scan line, located on the first region;
a first sub-pixel, electrically connected to the first scan line;
a second scan line, located on the second region;
a second sub-pixel, electrically connected to the second scan line; and
a common electrode, located on the substrate, wherein a vertical distance between the common electrode and the first scan line is V11, a vertical distance between the common electrode and the second scan line is V2, and V2>V11,
wherein the substrate further has a third region, the third region is connected to the second region, and a notch is located between the first region and the third region, and
the first scan line extends to the third region, and a vertical distance between the first scan line and the common electrode on the third region is V13.

2. The pixel array substrate as claimed in claim 1, further comprising:
an insulation layer, located on the first scan line and the second scan line, and having a thickness of 0.6 μm to 0.9 μm; and
a passivation layer, located on the insulation layer, and having a thickness of 1.8 μm to 2.2 μm.

3. The pixel array substrate as claimed in claim 2, wherein the passivation layer has an open hole, and the open hole is overlapped with the first scan line, wherein a part of the common electrode is filled in the open hole, and the vertical distance between the common electrode and the first scan line corresponds to the open hole.

4. The pixel array substrate as claimed in claim 3, wherein the insulation layer has an opening, the opening does not penetrate through the insulation layer, and the opening is overlapped with the open hole, wherein a part of the common electrode is filled in the opening.

5. The pixel array substrate as claimed in claim 1, wherein V11=V13.

6. The pixel array substrate as claimed in claim 1, wherein V11>V13.

7. A pixel array substrate, comprising:
a substrate, having a first region and a second region, wherein a length of the first region is smaller than a length of the second region, two opposite sides of the second region respectively correspond to two opposite sides of the substrate, and at least one side of the first region does not correspond to one of the two opposite sides of the substrate;
a first scan line, located on the first region;
a first sub-pixel, electrically connected to the first scan line;
a second scan line, located on the second region;
a second sub-pixel, electrically connected to the second scan line; and
a common electrode, located on the substrate, wherein a vertical distance between the common electrode and the first scan line is V11, a vertical distance between the common electrode and the second scan line is V2, and V2>V11,
wherein the substrate further has a third region and a fourth region, the third region is connected to the second region, the fourth region is connected to the third region and the first region, and a through hole with a closed contour is located among the first region, the second region, the third region and the fourth region.

8. A pixel array substrate, comprising:
a substrate, having a first region and a second region, wherein a length of the first region is smaller than a length of the second region, two opposite sides of the second region respectively correspond to two opposite sides of the substrate, and at least one side of the first region does not correspond to one of the two opposite sides of the substrate;
a first scan line, located on the first region;
a first sub-pixel, electrically connected to the first scan line;
a second scan line, located on the second region;
a second sub-pixel, electrically connected to the second scan line;
a common electrode, located on the substrate, wherein a vertical distance between the common electrode and the first scan line is V11, a vertical distance between the common electrode and the second scan line is V2, and V2>V11;
an insulation layer, located on the first scan line and the second scan line; and
a passivation layer, located on the insulation layer,
wherein the passivation layer has an open hole, and the open hole is overlapped with the first scan line, wherein a part of the common electrode is filled in the open hole, and the vertical distance between the common electrode and the first scan line corresponds to the open hole.

\* \* \* \* \*